UNITED STATES PATENT OFFICE.

AUSTIN G. DAY, OF NEW YORK, N. Y.

IMPROVEMENT IN COMPOUNDS OF INDIA-RUBBER AND KERITE.

Specification forming part of Letters Patent No. 210,407, dated December 3, 1878; application filed March 8, 1877.

CASE D.

*To all whom it may concern:*

Be it known that I, AUSTIN G. DAY, of the city, county, and State of New York, have invented a new vulcanized product, which is composed of a combination of natural india-rubber and the new compound which I term "Artificial Caoutchouc" or "Kerite," described in Letters Patent of the United States granted to me therefor, of even date herewith, Case B; and I hereby declare that the following is a full, clear, and exact description of the same.

The object of this invention is to provide a product which shall cost very much less than the ordinary india-rubber compounds formed exclusively, or almost exclusively, of natural caoutchouc vulcanized, and which shall at the same time be well adapted to take the place of the latter in the arts. The ingredients which are essential to it are india-rubber, crude kerite, and sulphur.

To enable those skilled in the practical manufacture of india-rubber articles to make and use my new product, I will proceed to describe the manner in which I form it.

The proportions in which the natural rubber and the crude kerite may be combined will admit of a wide variation; but to make a good product I may sometimes take, say, about twenty pounds of Para rubber, one pound of sulphur, and five pounds litharge, which should first be well mixed together on steam-grinders, in the way well known to india-rubber workers. I then take, say, twenty to forty pounds of the crude kerite which has been made according to my above-mentioned Letters Patent, and grind it on the rolls until it is warm. When thus prepared, I mix it with the rubber in the usual manner, and grind the mass fine. In this condition it is ready to be made into the articles for which it is to be used, and it is then vulcanized in the same way as ordinary india-rubber compounds are. The heat which I frequently employ for this purpose is run during three to four hours up to about 275° to 280° Fahrenheit, in the well-known manner; but other temperatures and other lengths of heating-times may be adopted.

As stated above, no particular proportions of the materials are essential, and the relative amounts of each of them may be largely varied without departing from my invention.

If desired, as much as three pounds, or even more, of the crude kerite may be employed to one pound of rubber, and one pound to one and one-half, and in some cases even from two to six pounds, of sulphur to twenty pounds of rubber.

The determination of the proportions will generally depend upon the particular class of goods to be manufactured, such as shoes, belting, packing, hose, covering for telegraph-wire, clothing, &c., and they may be increased or diminished relatively to each other to meet all these uses, as well as a great variety of others.

In practice, each manufacturer would adopt such proportions of rubber, crude kerite, and the other ingredients used with them as would best suit the articles and grades of articles made by him.

Litharge is an assistant to the vulcanization of this new product, as it is in the case of ordinary rubber compounds, and the oxides and carbonates of many of the metals, as well as some of the earths, such as chalk and magnesia, may be used, when desired, in the way and for the purposes familiar to india-rubber manufacturers; but none of these substances are essential.

This new compound possesses many advantages which are of great importance. It is cheap, has greater permanence and durability than the ordinary rubber mixtures, and is especially valuable for the reason that it withstands the action of the elements, of climatic effects, and of sunlight, and of all corrosive and decomposing agents much better and longer than other rubber compounds. It does not absorb water, and its capacity to resist rain and moisture is far superior to that of most other rubber mixtures. Ozone, which destroys gutta-percha in an hour or two, does not affect it, and its insulating power is practically perfect.

Many of these important qualities are imparted to the product by the presence in it of my above-referred-to crude kerite, and they cause it, for such a leading use as covering land telegraph-wire and subterranean and submarine cables, as well as for many other purposes, to surpass anything hitherto known.

Having thus made known my invention, what I claim, and desire to secure by Letters Patent, is—

The new vulcanized product herein described, consisting of the combination of crude kerite with natural india-rubber, substantially in the proportions specified.

AUSTIN G. DAY.

Witnesses:
A. J. DE LACY,
JOHN J. DIXON.